(12) United States Patent
Nagashima et al.

(10) Patent No.: US 9,352,401 B2
(45) Date of Patent: May 31, 2016

(54) INDEXABLE BALL END MILL

(75) Inventors: Yoshimitsu Nagashima, Narita (JP);
Yoshiyuki Kobayashi, Narita (JP);
Haruhisa Higasayama, Toyota (JP);
Seiji Niwa, Toyota (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 300 days.

(21) Appl. No.: 14/002,599

(22) PCT Filed: Mar. 5, 2012

(86) PCT No.: PCT/JP2012/055562
§ 371 (c)(1),
(2), (4) Date: Aug. 30, 2013

(87) PCT Pub. No.: WO2012/118222
PCT Pub. Date: Sep. 7, 2012

(65) Prior Publication Data
US 2013/0336731 A1   Dec. 19, 2013

(30) Foreign Application Priority Data

Mar. 3, 2011   (JP) ................................ 2011-046814

(51) Int. Cl.
*B23C 5/10*    (2006.01)
(52) U.S. Cl.
CPC ............. *B23C 5/1027* (2013.01); *B23C 5/1036* (2013.01); *B23C 5/1045* (2013.01); *Y10T 407/191* (2015.01); *Y10T 407/192* (2015.01); *Y10T 407/1908* (2015.01)
(58) Field of Classification Search
CPC ............ B23B 2251/50; B23B 2240/08; B23C 5/1036; B23C 5/00; B23C 5/10; B23C 2210/00; B23C 2210/02; B23C 2210/16; Y10T 407/192; Y10T 407/1906; Y10T 407/1908; Y10T 407/1928; Y10T 407/1934; Y10T 407/1946
USPC ............................... 407/33, 34, 40, 44, 47, 53
See application file for complete search history.

(56) References Cited

U.S. PATENT DOCUMENTS

| | | | |
|---|---|---|---|
| 4,623,285 A | 11/1986 | Costil | |
| 4,934,881 A * | 6/1990 | Tsujimura | ............. B23C 5/1018 407/118 |
| 5,542,899 A | 8/1996 | Yamada et al. | |

(Continued)

FOREIGN PATENT DOCUMENTS

| | | |
|---|---|---|
| JP | 52-103017 U | 8/1977 |
| JP | 54-29490 U | 2/1979 |

(Continued)

OTHER PUBLICATIONS

Machine Translation JP 2000-288822, pp. 1-2, Aug. 21, 2015.*
International Search Report for PCT/JP2012/055562 dated Apr. 3, 2012.

*Primary Examiner* — Daniel Howell
*Assistant Examiner* — Nicole N Ramos
(74) *Attorney, Agent, or Firm* — Sughrue Mion, PLLC

(57) ABSTRACT

An indexable ball end mill comprising first to third inserts having arcuate cutting edges detachably attached with first to third screws to first to third seats in a semispherical tip end portion of a tool body; a first threaded hole for the first screw slantingly penetrating a slit-shaped first seat; the first insert having an inclined hole to avoid interference between the first screw and the second and third screws; a hole of the first insert and the first screw having at least partially finished surfaces, so that when the first screw penetrates the first insert attached to the first seat, the first insert is precisely positioned by tight engagement of both finished surfaces.

11 Claims, 11 Drawing Sheets

(56) References Cited

U.S. PATENT DOCUMENTS

| | | | |
|---|---|---|---|
| 5,782,589 A * | 7/1998 | Cole | B23B 51/048 407/33 |
| 6,514,019 B1 | 2/2003 | Schulz | |
| 6,607,333 B2 | 8/2003 | Satran et al. | |
| 2002/0094244 A1 | 7/2002 | Satran et al. | |
| 2008/0003072 A1* | 1/2008 | Kim | B23B 51/0009 408/199 |
| 2008/0199264 A1* | 8/2008 | Fouquer | B23C 5/2208 407/40 |
| 2011/0243672 A1* | 10/2011 | Kim | B23C 5/1045 407/42 |

FOREIGN PATENT DOCUMENTS

| | | |
|---|---|---|
| JP | 60-85815 A | 5/1985 |
| JP | 07-164223 A | 6/1995 |
| JP | 11-239911 A | 9/1999 |
| JP | 11245111 A * | 9/1999 |
| JP | 2000288822 A * | 10/2000 |
| JP | 2001-121339 A | 5/2001 |
| JP | 2003-511248 A | 3/2003 |
| JP | 4531981 B2 | 8/2010 |
| WO | WO 2010061988 A1 * | 6/2010 |

* cited by examiner

INDEXABLE BALL END MILL

CROSS REFERENCE TO RELATED APPLICATIONS

This application is a National Stage of International Application No. PCT/JP2012/055562 filed Mar. 5, 2012 (claiming priority based on Japanese Patent Application No. 2011-046814, filed Mar. 3, 2011), the contents of which are incorporated herein by reference in their entirety.

FIELD OF THE INVENTION

The present invention relates to a four-flute indexable ball end mill, particularly to an indexable ball end mill capable of conducting the finish-machining of dies, etc. at high speed and high precision because of high fixing position precision of an insert.

BACKGROUND OF THE INVENTION

Ball end mills have conventionally been used for the cutting of dies, etc., and a recent trend of making dies larger demands ball end mills to have cutting capability with higher speed, efficiency and precision as well as longer life. Further demand is to make ball end mills indexable for cutting cost reduction. To meet such demands, various indexable tools have been proposed.

JP 60-85815 A discloses, as shown in FIG. 20, a rotary cutting tool comprising (a) a holder 103 having four-direction perpendicular slits 101 in a tip end portion, and a sphere 102 bonded to a surface on the bottom side of the slits 101, (b) four fan-shaped cutting chips 104 detachably attached to the slits 101 of the holder 103, and (c) pressing plates 105 extending in an axial direction of the holder 103 and threadably engaging the holder 103 for fixing the cutting chips 104, each cutting chip 104 having a circular notch in a fan-shaped center portion, and the positioning of each cutting chip 104 being achieved by the circular notch attached to the sphere 102 in the holder 103. Though this rotary cutting tool is a four-flute ball end mill, the cutting chips 104 may be detached in high-speed cutting, because each cutting chip 104 is fixed by the screw 106 and the pressing plate 105. Also, because the positioning of each cutting chip 104 is achieved by contact between the circular notch of each cutting chip 104 and the sphere 102, it is difficult to fix the cutting chips 104 with high precision whenever exchanged, in view of the dimension precision of the circular notch and the sphere 102, the positioning precision and durability of the sphere 102, etc.

JU 54-29490 A discloses, as shown in FIG. 21, a boring tool comprising (a) a holder 204 comprising a pair of projections 202 sandwiching an inclined slit 201, and a threaded hole 203 penetrating both projections 202 through the slit 201, (b) a cutting edge chip 206 having a center through-hole 205, and (c) a fastening bolt 207 threadably engaging a threaded hole 203 of both projections 202 through the through-hole 205 of the cutting edge chip 206 for fixing the cutting edge chip 206, the cutting edges of the cutting edge chip 206 and a side surface of each projection 202 constituting a chip-evacuating groove 208 having an obtuse angle. Though the cutting edge chip 206 is inclined from the projections 202 in this boring tool, the through-hole 205 of the cutting edge chip 206 is not in contact with the threaded portion of the fastening bolt 207. The cutting edge chip 206 is fixed by decreasing the width of the slit 201 by fastening the bolt 207. However, this boring tool is so-called 2-flute, having insufficient cutting efficiency. In addition, such fixing method of the cutting edge chip 206 has such low positioning precision that it is not suitable as a finishing tool for conducting the three-dimensional cutting of die cavities, etc. at high speed and high precision.

JP 2001-121339 A discloses, as shown in FIG. 22, a throwaway end mill comprising a pair of projections 302 having an inclined slit 301 in a tip end portion, a cutting chip 303 attached to the slit 301, and a clamp bolt 304 penetrating the cutting chip 303 and threadably engaging a pair of projections 302, thereby having large chip pockets 305. However, because this throwaway end mill is so-called 2-flute, it does not have sufficient cutting efficiency. In addition, because the cutting chip 303 is not fixed by the clamp bolt 304, the positioning precision of the cutting edge chip 303 is low. Accordingly, this throwaway end mill is not suitable as a finishing tool for conducting the three-dimensional cutting of die cavities, etc. at high speed and high precision.

JP 11-239911 A discloses, as shown in FIG. 23, a throwaway-type cutting tool comprising a tool body 402 having a slit-shaped chip seat 401 extending in a diametrical direction, a throwaway chip 403 attached to the slit-shaped chip seat 401, and a screw 405 threadably engaging the tip end portion through a through-hole 404 of the throwaway chip 403. The chip seat 401 comprises a conical seat surface 406 slightly biased rearward in a portion corresponding to a conical head 405a of the screw 405 on one side surface, and a hole receiving a cylindrical portion 407 of the screw 405 on the other side surface. A side wall 408 of the hole is a reference surface for positioning the throwaway chip 403. When the screw 405 is fastened with the throwaway chip 403 attached to the slit-shaped chip seat 401 of the tool body 402, the conical head 405a of the screw 405 is pressed onto the conical seat surface 406, because the conical seat surface 406 is biased toward a bottom surface of the chip seat 401 by Δt. However, because this throwaway-type cutting tool is so-called 2-flute, it has insufficient cutting efficiency, not suitable for high speed cutting of die cavities, etc.

Japanese Patent 4531981 discloses, as shown in FIG. 24, a boring tool comprising a holder 502 having a slit 501 in a tip end portion; an insert 504 having an inclined tapered hole 503 and attached to the slit 501; and a clamp screw 505 having a tapered portion 505c between a head 505a and a threaded portion 505b, the tapered portion 505c penetrating the inclined tapered hole 503 of the insert 504, and the threaded portion 505b threadably engaging a threaded hole in the tip end portion. When the tapered portion 505c of the clamp screw 505 engages the inclined tapered hole 503 of the insert 504, the insert 504 is pressed onto a stopper surface of the tip end portion by a wedge function, thereby preventing the vibration of the insert 504 during cutting. However, because this boring tool is so-called 2-flute, it has insufficient cutting efficiency, failing to be used as a ball end mill for cutting die cavities, etc. at high speed.

OBJECT OF THE INVENTION

Accordingly, an object of the present invention is to provide a four-flute indexable ball end mill in which inserts can be attached to a tip end portion of a tool body with high precision.

SUMMARY OF THE INVENTION

As a result of intensive research in view of the above object, the inventor has found that (a) when a large arcuate edge insert and small arcuate edge inserts are attached to a tip end portion of a tool body to provide a four-flute indexable ball end mill, interference between a screw for the large arcuate edge insert and screws for the small arcuate edge inserts can be avoided by inclining the large arcuate edge insert to its screw, and (b) the precise positioning of the large arcuate edge insert can be achieved by causing part of a hole of the large arcuate edge insert to tightly engage part of the screw. The present invention has been completed based on such finding.

Thus, the indexable ball end mill of the present invention comprises first to third inserts having arcuate cutting edges detachably attached with first to third screws to first to third seats in a semispherical tip end portion of a tool body, the first seat being constituted by a slit extending in a diametrical direction with a rotation center axis of the semispherical tip end portion as a center, a chip pocket being located in front of the slit in a rotation direction, and the slit dividing the semispherical tip end portion to two half bodies;

each of the second and third seats being a notch formed in each half body, each notch comprising a seating surface provided in a front surface of each half body in a rotation direction, and a chip pocket located in front of the seating surface in a rotation direction;

a first threaded hole for the first screw slantingly penetrating the slit from one half body to the other half body in the semispherical tip end portion, and second and third threaded holes for the second and third screws being open on the seating surfaces of the second and third seats, thereby avoiding interference between the first screw and the second and third screws;

the first insert having an inclined hole which is aligned with the first threaded hole when the first insert is attached to the first seat; and at least part of the hole of the first insert having a finished surface, the first screw having a finished surface at least partially between its head and its threaded portion, and the finished surface of the hole of the first insert tightly engaging the finished surface of the first screw when the first screw penetrates the first insert attached to the first seat, thereby precisely positioning the first insert.

The first threaded hole is preferably located on the rear side of the second and third threaded holes in the tool body.

A straight line connecting a pair of cutting edges of the first insert is preferably perpendicular to a straight line connecting the cutting edges of the second and third inserts.

It is preferable that the arcuate cutting edges of the first insert attached to the first seat pass substantially an apex of the semispherical tip end portion, and that an angle α between a top end of the arcuate cutting edge of each of the second and third inserts attached to the second and third seats and a rotation center axis of the tool body is 15-30°.

It is preferable that the arcuate cutting edges of the first insert have a center angle β of 180° or more, and that the arcuate cutting edges of the second and third inserts have a center angle γ of 90° or less.

The first insert is preferably made of cemented carbide. Each of the second and third inserts preferably has a structure in which an arcuate cutting edge chip of sintered cubic boron nitride is bonded to a cemented carbide substrate.

The finished surface of the inclined hole of the first insert preferably has smaller surface roughness than that of the finished surface of the first screw.

The inclination angle θ of the first threaded hole to a straight line perpendicular to the centerline of the first seat is preferably 20-40° in a direction opposite to the rotation direction of the tool body.

It is preferable that the hole of the first insert comprises a finished, small-diameter, cylindrical center hole portion, and large-diameter, cylindrical hole portions on both sides of the small-diameter, cylindrical center hole portion, and that the first screw comprises a finished, large-diameter, solid cylinder portion between the head and the threaded portion. The inner diameter of the small-diameter, cylindrical center hole portion is preferably larger than the outer diameter of the large-diameter, solid cylinder portion by 3-10 μm.

DESCRIPTION OF THE PREFERRED EMBODIMENTS

The indexable ball end mill of the present invention will be explained in detail below referring to the attached drawings.

[1] Tool Body

Figure 1:
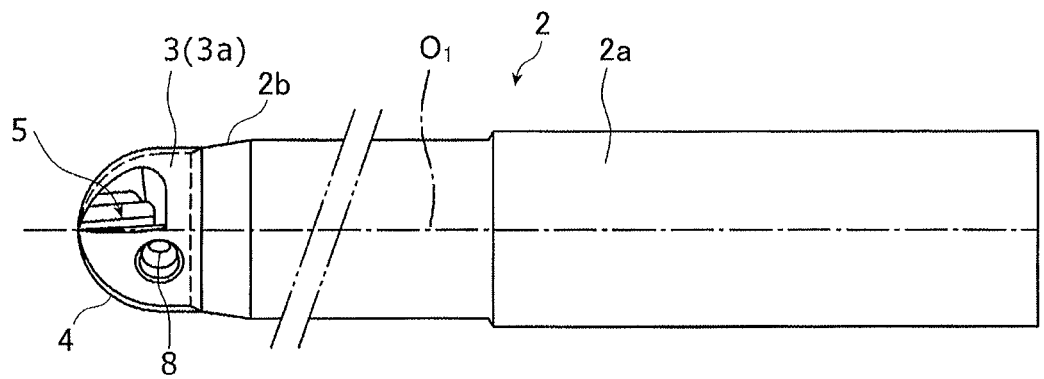
FIG. 1 is a side view showing a tool body in the indexable ball end mill of the present invention.
Figure 2:
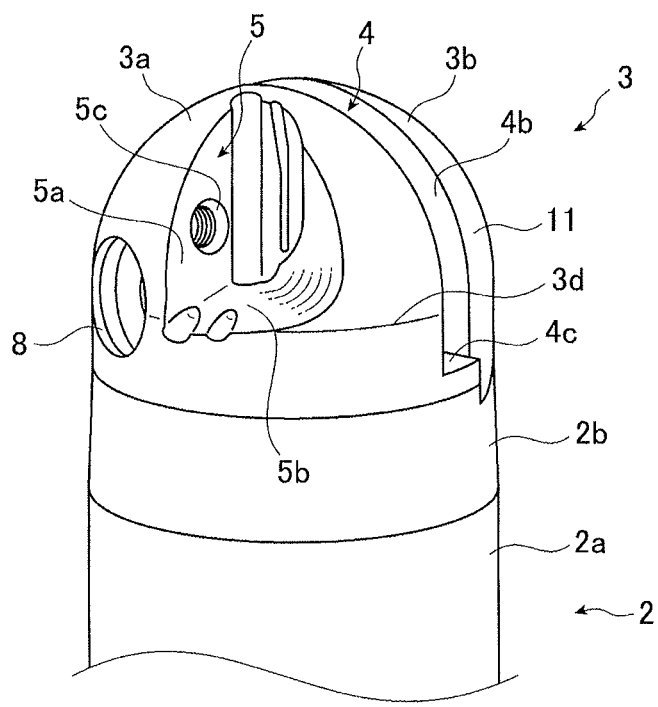
FIG. 2 is a perspective view showing a semispherical tip end portion of a tool body in the indexable ball end mill of the present invention.
Figure 3:
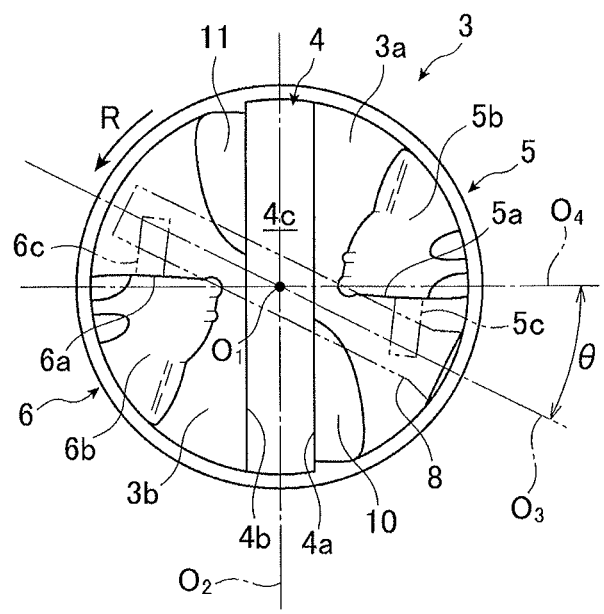
FIG. 3 is a front view showing a semispherical tip end portion in the indexable ball end mill of the present invention.
Figure 4:
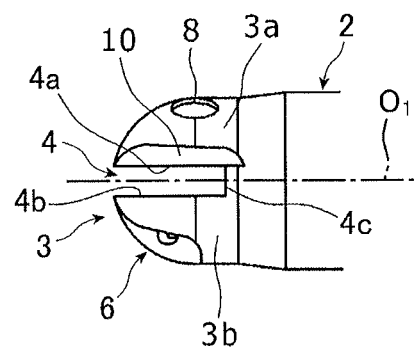
FIG. 4 is a side view showing a semispherical tip end portion in the indexable ball end mill of the present invention.

FIG. 1 shows the overall structure of a tool body 2 with no inserts attached in the indexable ball end mill according to an embodiment of the present invention, FIG. 2 shows a semispherical tip end portion 3 of the tool body 2 in detail, FIG. 3 shows the shape of the semispherical tip end portion 3 when viewed from the tip end side (from the left side in FIG. 1), and FIG. 4 shows the shape of the semispherical tip end portion 3 with 90° rotation from FIG. 1 around a rotation center axis $O_1$.

As shown in FIG. 1, the tool body 2 comprises a cylindrical shank portion 2a, which is to be mounted to a machining center, a tapered shank portion 2b provided at a tip end of the cylindrical shank portion 2a, and a semispherical tip end portion 3 provided at a tip end of the tapered shank portion 2b. As shown in FIG. 2, the semispherical tip end portion 3 comprises a cylindrical portion on the side of the tapered shank 2b, and a semispherical portion on the tip end side. A boundary between the cylindrical portion and the semispherical portion is shown by 3d. The tool body 2 may be made of tool steel such as SK61, etc.

The semispherical tip end portion 3 comprises a first seat 4 to which a first insert is detachably fixed with a screw, a second seat 5 to which a second insert is detachably fixed with a screw, and a third seat 6 to which a third insert is detachably fixed with a screw. The first seat 4 is constituted by a slit dividing the semispherical tip end portion 3. Namely, the first seat 4 is constituted by a slit having parallel-opposing side walls 4a, 4b and a bottom 4c, the slit extending from an apex of the semispherical tip end portion 3 positioning on the rotation center axis $O_1$ of the tool body 2 to a predetermined depth along the rotation center axis $O_1$, and penetrating the semispherical tip end portion 3 in a diametrical direction of the tool body 2. Accordingly, the longitudinal direction of the first seat 4 is in alignment with the diametrical direction of the tool body 2 as shown in FIG. 3, and the depth direction of the first seat 4 is in alignment with the rotation center axis $O_1$ as shown in FIG. 4.

With the slit-shaped first seat 4, the semispherical tip end portion 3 is divided to a first half body 3a and a second half body 3b. Each half body 3a, 3b comprises a chip pocket 10, 11 in front of the slit-shaped first seat 4 in a rotation direction.

As shown in FIG. 3, a first threaded hole 8 for fixing the first insert 12 attached to the slit-shaped first seat 4 with a first screw 9 (see FIG. 13) has an opening on the first half body 3a, and extends in the second half body 3b to a predetermined depth. A center axis $O_3$ of the first threaded hole 8 is inclined from a straight line $O_4$ perpendicular to a centerline $O_2$ of the slit-shaped first seat 4 by an angle θ in a direction opposite to the rotation direction R of the tool body 2. The inclination angle θ of the first threaded hole 8 is preferably 20-40°. A part of the first threaded hole 8 positioning in the second half body 3b has a thread engageable with a threaded portion 9e of the first screw 9 (see FIG. 13).

As shown in FIG. 3, the first half body 3a comprises a notch-shaped second seat 5, to which the second insert 13 is attached, and the second half body 3b comprises a notch-shaped third seat 6, to which the third insert 14 is attached. In a preferred embodiment of the present invention, the second seat 5 and the third seat 6 are arranged at symmetrical positions with respect to the rotation center axis $O_1$, though not restrictive.

The second seat 5 comprises a seating surface 5a to which the second insert 13 is fixed with a second screw 15, and a chip pocket 5b located in front of the second insert 13 in a rotation direction, and the third seat 6 comprises a seating surface 6a to which the third insert 14 is fixed with a third screw 16, and a chip pocket 6b located in front of the third insert 14 in a rotation direction. The seating surfaces 6a, 6b are respectively provided with second and third threaded holes 5c, 6c with which the second and third screws 15, 16 (see FIG. 18) are threadably engageable. Because the second and third threaded holes 5c, 6c are separate from the first threaded hole 8 in an axial direction of the tool body 2 as shown in FIG. 19, there is no interference between the first screw 9 and the second and third screws 15, 16. Each of the second and third seats 5, 6 is provided with arcuate notches in portions in which corners of the insert 13, 14 are located. In a preferred embodiment of the present invention, the second seat 5 and the third seat 6 have the same shape, because the second insert 13 and the third insert 14 have the same shape.

Figure 5:
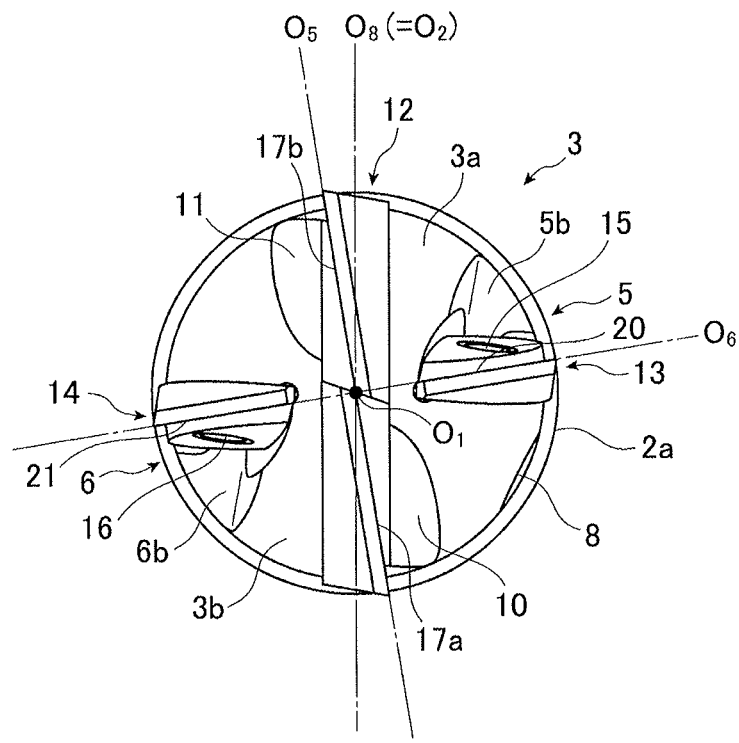
FIG. 5 is a front view showing a semispherical tip end portion with inserts in the indexable ball end mill of the present invention.
Figure 6:
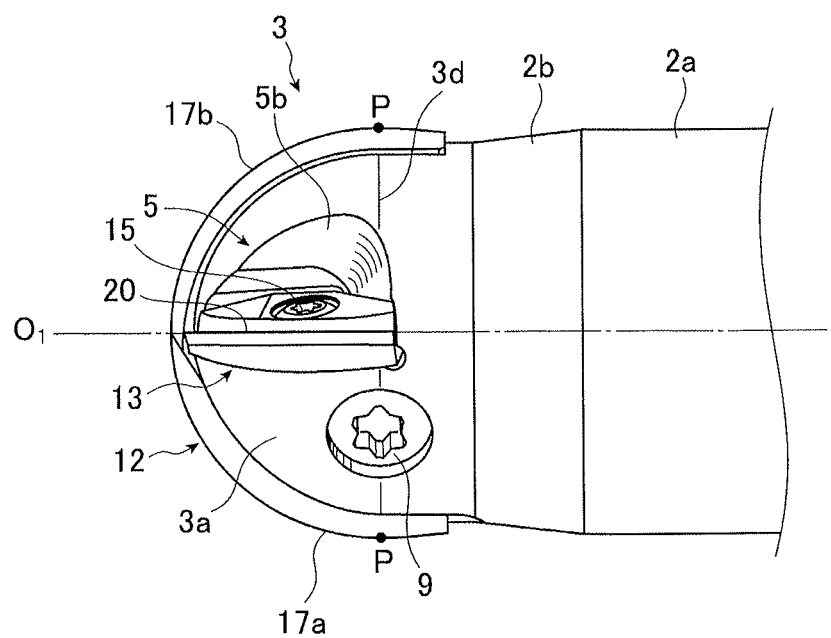
FIG. 6 is a side view showing a semispherical tip end portion with inserts in the indexable ball end mill of the present invention.
Figure 7:
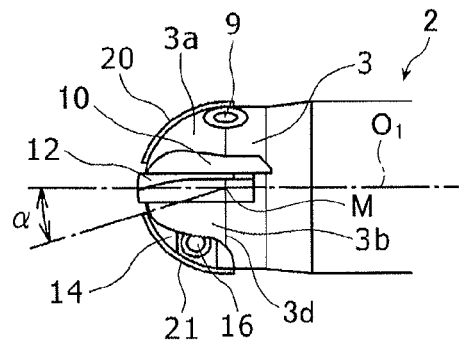
FIG. 7 is a side view (rotated by 90° from FIG. 6) showing a semispherical tip end portion with inserts in the indexable ball end mill of the present invention.

FIGS. 5-7 show the first to third inserts 12-14 attached to the first to third seats 4-6 in the semispherical tip end portion 3. As is clear from FIG. 5, a direction $O_6$ of arcuate cutting edges 20, 21 of the second and third inserts 13, 14 is perpendicular to a direction $O_5$ of arcuate cutting edges 17a, 17b of the first insert 12, but inclined from a centerline $O_8$ of the first insert 12, which is in alignment with a centerline $O_2$ of the first seat. As is clear from FIG. 7, top ends of the arcuate cutting edges 20, 21 of the second and third inserts 13, 14 are separate from the rotation center axis $O_1$. The distance from the top end of the arcuate cutting edge 20, 21 of each of the second and third inserts 13, 14 to the rotation center axis $O_1$ is, as shown in FIG. 7, expressed by an angle α between the top end of the arcuate cutting edge 20, 21 and the rotation center axis $O_1$, with a position M corresponding to the boundary line 3d on the rotation center axis $O_1$ as a center. As described later, the angle α is preferably 15-30°.

[2] Insert
(1) First Insert
(a) Shape

Figure 8:
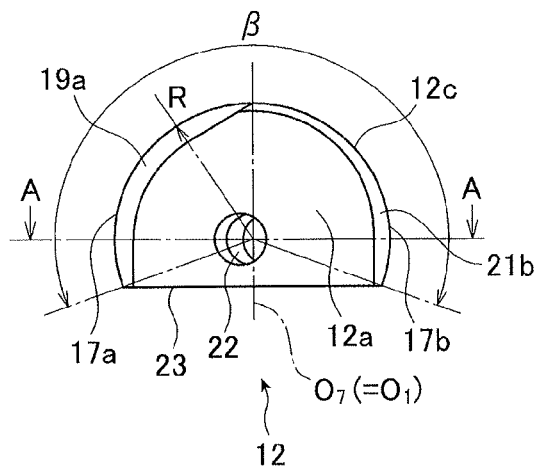
FIG. 8 is a plan view showing a first insert, which is to be attached to the indexable ball end mill of the present invention.
Figure 9A:
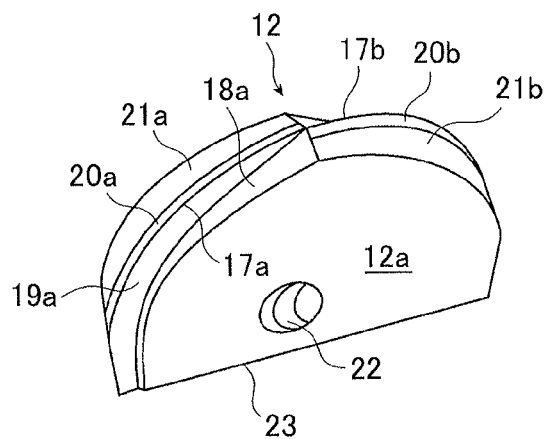
FIG. 9(a) is a perspective view showing the first insert of FIG. 8 from the side of one flat portion.
Figure 9B:
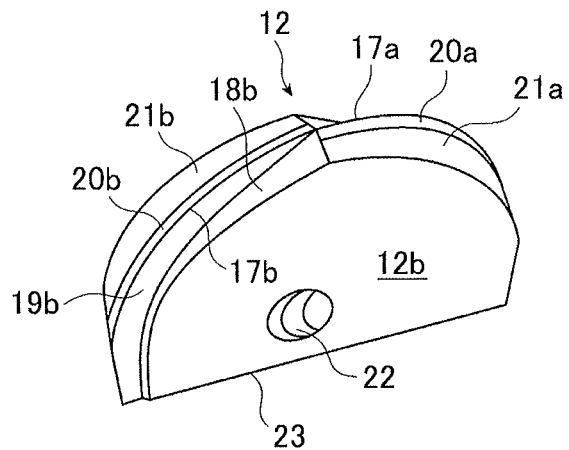
FIG. 9(b) is a perspective view showing the first insert of FIG. 8 from the side of the other flat portion.

As shown in FIGS. 8 and 9, the first insert 12 comprises a pair of flat surfaces 12a, 12b, an arcuate cutting edge 17a facing the flat surface 12a, an arcuate cutting edge 17b facing the flat surface 12b, an arcuate portion 18a located in front of the arcuate cutting edge 17a in a rotation direction and having a smaller outer diameter than that of the arcuate cutting edge 17a, a rake face 19a located between the arcuate cutting edge 17a and the arcuate portion 18a, a first flank 20a in contact with the arcuate cutting edge 17a, a second flank 21a extending from the first flank 20a, an arcuate portion 18b located in front of the arcuate cutting edge 17b in a rotation direction and having a smaller outer diameter than that of the arcuate cutting edge 17b, a rake face 19b located between the arcuate cutting edge 17b and the arcuate portion 18b, a first flank 20b in contact with the arcuate cutting edge 17b, a second flank 21b extending from the first flank 20b, a hole 22 slantingly penetrating a pair of flat surfaces 12a, 12b, and a straight flat bottom 23.

Figure 10:
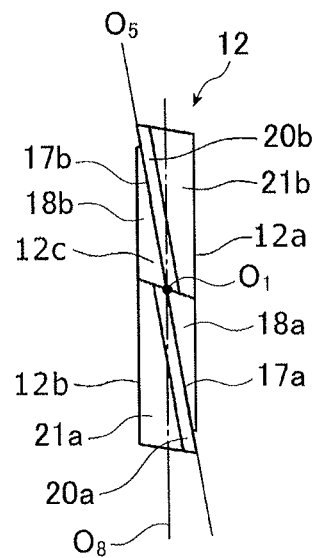
FIG. 10 is a front view showing the first insert of FIG. 8 from the side of cutting edges.

As shown in FIGS. 8 and 10, the two arcuate cutting edges 17a, 17b extend on a semicircular arc when viewed from a direction perpendicular to the cutting edges, and on a straight line when viewed from above. The two arcuate cutting edges 17a, 17b are closest at an apex of the semispherical tip end portion 3, at which they cross the rotation center axis $O_1$. Accordingly, when the first insert 12 is rotated around the rotation center axis $O_7$, which is identical to the rotation center axis $O_1$ of the tool body 2, loci of the arcuate cutting edges 17a, 17b form a hemisphere having a radius R. Such cutting edges 17a, 17b are generally called straight cutting edges or S-shaped cutting edges. The first flanks 20a, 20b are provided to form the arcuate cutting edges 17a, 17b precisely. Incidentally, when the two cutting edges 17a, 17b are arcuately connected, cutting edges exist even at the apex.

As shown in FIG. 8, a center angle β of an arc formed by the arcuate cutting edges 17a, 17b is preferably 180° or more. Because the center angle β of an arc formed by the arcuate cutting edges 17a, 17b exceeds 180°, for example, the finishing of a vertical wall of a die cavity is conducted by using portions of the cutting edges with a center angle β of 180° or less in downward cutting, and portions of the cutting edges with a center angle β of more than 180° in upward cutting, resulting in high cutting efficiency. The center angle β is preferably 180° to about 210°. With a center angle β of more than 210°, the insert is too long, suffering high cost.

Because the flat bottom 23 of the first insert 12 comes into close contact with the bottom 4c of the slit-shaped first seat 4, the flat bottom 23 is subject to finishing.

Figure 11:
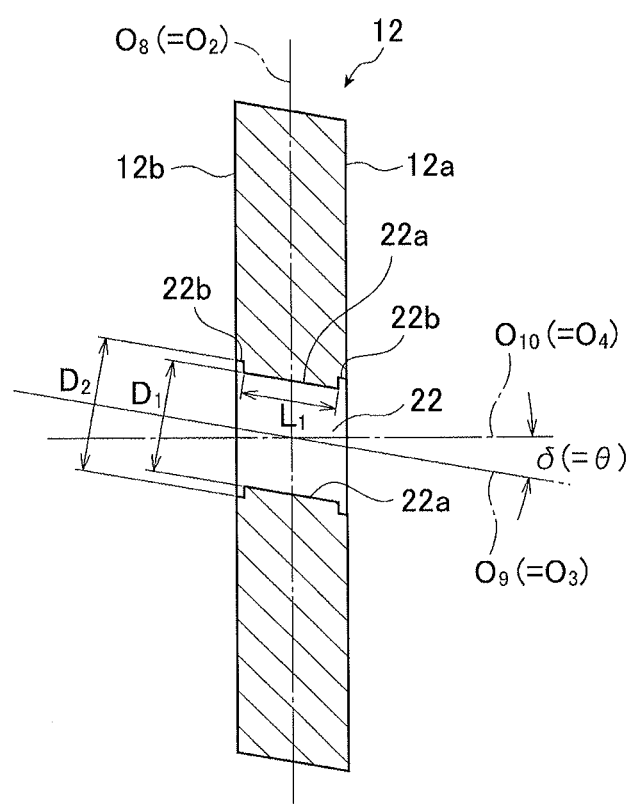
FIG. 11 is an enlarged cross-sectional view taken along the line A-A in FIG. 8.

The first feature of the present invention is that as shown in FIGS. 3 and 11, the first threaded hole 8 with which the first screw 9 is threadably engageable is inclined from the slit-shaped first seat 4, and the hole 22 of the first insert 12, which the first screw 9 penetrates, is inclined from a pair of the flat surfaces 12a, 12b. As shown in FIG. 19, the first feature avoids interference between the first screw 9 for fixing the first insert 12 and the second and third screws 15, 16 for fixing the second and third inserts 13, 14 even in the four-flute indexable ball end mill 1, thereby securing a sufficient space for the second and third screws 15, 16.

The direction of the inclined hole 22 is expressed by an angle δ between the centerline $O_9$ and a straight line $O_{10}$ perpendicular to the centerline $O_8$ of the first insert 12 (perpendicular to a pair of the flat surfaces 12a, 12b). Of course, the angle δ is equal to the angle θ. To secure a sufficient space for the second and third screws 15, 16 for fixing the second and third inserts 13, 14, the angle δ (=θ) is preferably 20-40°, more preferably 20-30°. With the angle δ(=θ) of less than 20°, sufficient space for the second and third screws 15, 16 is not secured. When the angle δ(=θ) is more than 40°, the formation of the inclined hole 22 is difficult.

As shown in FIG. 11, the inclined hole 22 is constituted by a small-diameter, cylindrical center hole portion 22a having a length $L_1$ and an inner diameter $D_1$, and large-diameter, cylindrical hole portions 22b each having a larger inner diameter $D_2$ than the inner diameter $D_1$ and located on both sides of the small-diameter, cylindrical center hole portion 22a. The small-diameter, cylindrical center hole portion 22a is so finished that it can tightly engage a finished, large-diameter, solid cylinder portion 9c of the first screw 9 as described later. The length $L_1$ of the small-diameter, cylindrical center hole portion 22a is preferably larger than the length $L_2$ of the large-diameter, solid cylinder portion 9c of the first screw 9 by about $D_1 \tan \delta$. Because of clearance of about 3-10 μm between the small-diameter, cylindrical center hole portion 22a and the large-diameter, solid cylinder portion 9c, the first screw 9 would not be easily inserted into the inclined hole 22 if the inclined hole 22 had an inner diameter $D_1$ as a whole. Accordingly, the formation of the large-diameter, cylindrical hole portions 22b on both inlet sides of the inclined hole 22 makes it easy to insert the first screw 9 into the inclined hole 22. The large-diameter, cylindrical hole portions 22b may be tapered.

(b) Production Method

The first insert 12 of cemented carbide is preferably produced by the following steps.

Figure 12:
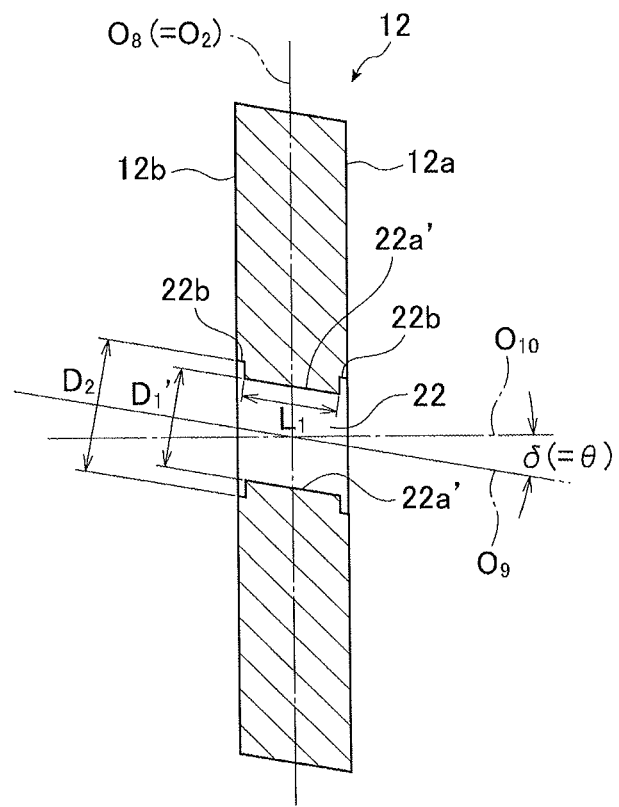
FIG. 12 is an enlarged cross-sectional view showing an as-sintered inclined hole in the first insert of FIG. 8.

(b1) Granulated powder comprising tungsten carbide particles, cobalt particles and if necessary, additives is pressed to form a green body for the first insert 12. As shown in FIG. 12, the inclined hole 22 of the green body comprises a small-diameter, cylindrical center hole portion 22a having a length $L_1$ and an inner diameter $D_1'$, and large-diameter, cylindrical hole portions 22b arranged on both sides of the small-diameter, cylindrical center hole portion 22a and each having a larger inner diameter $D_2$ than the inner diameter $D_1'$. The small-diameter, cylindrical center hole portion 22a and the large-diameter, cylindrical hole portions 22b are formed larger by sintering shrinkage of 20-30% and cutting margin of 0.05-0.3 mm.

(b2) The green body is sintered at a predetermined temperature (for example, about 1300-1400° C.).

(b3) After sintering, the small-diameter, cylindrical center hole portion 22a is finished to have an inner diameter $D_1$ by diamond grinding, buffing, honing, etc. The finished, small-diameter, cylindrical center hole portion 22a preferably has surface roughness Rza of 1.0 μm or less.

(b4) The second arcuate flanks 21a, 21b are finished by a diamond grinder to form the first flanks 20a, 20b and the arcuate cutting edges 17a, 17b. The bottom 23 is made flat by finishing.

(b5) A surface of the first insert 12 except for the inclined hole 22 is provided with a wear-resistant, heat-resistant coating of Ti—Al nitrides, Ti—Si nitrides, Ti—B nitrides, etc. by a PVD or CVD method.

(2) First Screw

Figure 13:
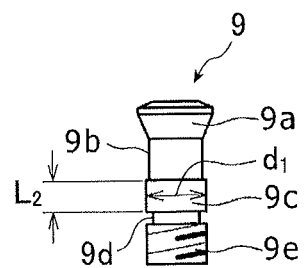
FIG. 13 is a side view showing a first screw for fixing the first insert.
Figure 14:
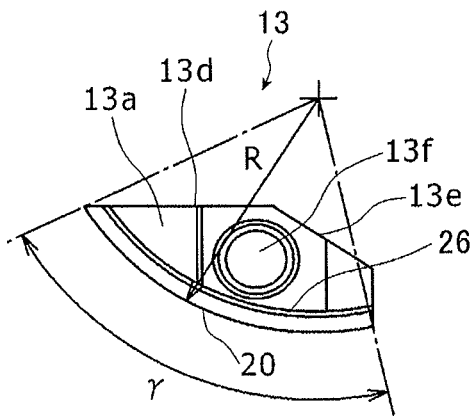
FIG. 14 is a plan view showing a second insert, which is to be attached to the indexable ball end mill of the present invention.
Figure 15:
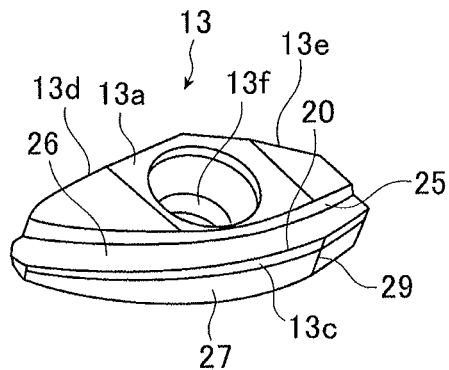
FIG. 15 is a perspective view showing the second insert of FIG. 14.
Figure 16:
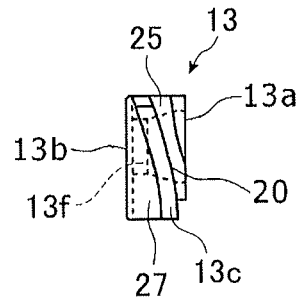
FIG. 16 is a left side view showing the second insert of FIG. 14.
Figure 17:
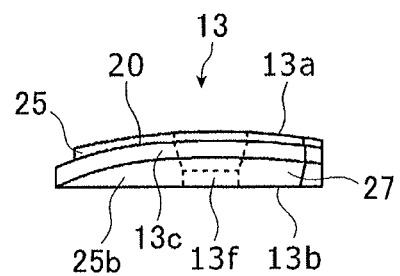
FIG. 17 is a front view showing the second insert of FIG. 14 from the side of a cutting edge.

The first screw 9 for fixing the first insert 12 to the slit-shaped first seat 4 comprises, as shown in FIG. 13, a head 9a, a first small-diameter solid cylinder portion 9b, a finished, large-diameter, solid cylinder portion 9c, a second small-diameter solid cylinder portion 9d, and a threaded portion 9e in this order. The second feature of the present invention is that when the first screw 9 is inserted into the inclined hole 22 of the first insert 12, the finished, large-diameter, solid cylinder portion 9c tightly engages the finished, small-diameter, cylindrical center hole portion 22a of the inclined hole 22.

The large-diameter, solid cylinder portion 9c can be finished using a cylindrical diamond grinder, etc. The surface roughness Rzb of the finished, large-diameter, solid cylinder portion 9c is about 1.5-3.5 μm, larger than the surface roughness Rza of the small-diameter, cylindrical center hole portion 22a of the inclined hole 22 of the first insert 12. This is because (a) when the small-diameter, cylindrical center hole portion 22a of the first insert 12 and the large-diameter, solid cylinder portion 9c of the first screw 9 have different surface roughness, they have a decreased friction force when threadably engaged, and because (b) machining precision can be controlled more easily by higher-precision grinding of the small-diameter, cylindrical center hole portion 22a of the first insert 12 made of wear-resistant cemented carbide to form a reference surface.

The first screw 9 can be produced by forming the head 9a, the first small-diameter solid cylinder portion 9b, the large-diameter, solid cylinder portion 9c, the second small-diameter solid cylinder portion 9d and the threaded portion 9e by turning of a rod of tool steel such as SK61, etc., and finishing an outer surface of the large-diameter, solid cylinder portion 9c by grinding with a diamond grinder, etc. The outer diameter of the large-diameter, solid cylinder portion 9c is made smaller than the inner diameter of the small-diameter, cylindrical center hole portion 22a of the first insert 12 by about 3-10 μm. With such small clearance, the large-diameter, solid cylinder portion 9c of the first screw 9 is fit in the small-diameter, cylindrical center hole portion 22a of the first insert 12.

(3) Second and Third Inserts

Because the second and third inserts 13, 14 have the same shape in a preferred embodiment of the present invention, explanation will be made only on the second insert 13 as the case may be. This explanation is also applicable to the third insert 14.

As shown in FIGS. 14-17, the second insert 13 in a flat plate shape comprises a front surface 13a, a rear surface 13b, an arcuate portion 13c having a cutting edge 20 between the front surface 13a and the rear surface 13b, a first flat portion 13d, a second flat portion 13e, and a second hole 13f extending from the front surface 13a to the rear surface 13b for receiving the second screw 15. An arcuate portion 25 having a smaller outer diameter than that of the arcuate portion 13c is provided in front of the cutting edge 20 in a rotation direction, and a rake face 26 is provided between the arcuate portion 13c and the arcuate portion 25. The arcuate portion 13c functions as a first flank, and the arcuate portion 27 on the rear side of the arcuate portion 13c in a rotation direction functions as a second flank. The front surface 13a has steps on both sides of the second hole 13f.

The second insert 13 is constituted by an integral cemented carbide substrate, or a cemented carbide substrate brazed with a hard sintered member having an arcuate cutting edge. The hard sintered member may be, for example sintered cubic boron nitride (CBN). With a hard sintered CBN member having an arcuate cutting edge, the second insert 13 exhibits sufficient wear resistance and heat resistance even in high-speed cutting.

The shape and size of each of the second and third inserts 13, 14 are determined, such that when the tool body 2 is rotated with the first to third inserts 12, 13, 14 fixed to the first to third seats 4, 5, 6 in the semispherical tip end portion 3, the loci of the arcuate cutting edges 17a, 17b, 20, 21 of the first to third inserts 12, 13, 14 form completely the same hemisphere having a radius R.

To avoid interference between the first insert 12 and the second and third inserts 13, 14 near the apex of the semispherical tip end portion 3, the arcuate cutting edge 20, 21 of each of the second and third inserts 13, 14 preferably has a center angle γ of 90° or less. As a result, as shown in FIG. 7, an angle α between the arcuate cutting edge 20, 21 of each of the second and third inserts 13, 14 and the rotation center axis $O_1$ is 15-30°. When the angle α is less than 15°, the tip ends of the second and third inserts 13, 14 are too close to the rotation center axis $O_1$, so that the arcuate cutting edges 20, 21 have a small peripheral speed at their tip ends. As a result, the second and third inserts 13, 14 are easily damaged at their tip ends at the time of cutting a flat surface. On the other hand, when the angle α is more than 30°, the second and third inserts 13, 14 have too short arcuate cutting edges 20, 21, resulting in low machining efficiency, and causing damage in the first insert 12 because of too large a load. With the center angle γ of 90° or less and the angle α of 15-30°, there is no interference between the arcuate cutting edges 20, 21 of the second and third inserts 13, 14 and the arcuate cutting edges 17a, 17b of the first insert 12 at the apex of the tool body 2.

The second and third inserts 13, 14 of cemented carbide can be produced by the same method as for the first insert 12 of cemented carbide, without necessity of finishing the inner surface of the hole 13f.

A method for bonding an arcuate cutting edge member of CBN to each of the second and third inserts 13, 14 comprises, for example, the following steps.

(a) First Step

Each of the second and third inserts 13, 14 is provided with a notch in advance in a portion corresponding to the cutting edge. Because the arcuate cutting edge member of CBN should be precisely fixed to the notch, a seat surface of the notch is finished by a diamond grinder, etc.

(b) Second Step

The arcuate cutting edge member is cut out of a disc-shaped CBN block by wire-cutting method, etc.

(c) Third Step

The arcuate cutting edge member of sintered CBN is brazed to the notch of each of the second and third inserts 13, 14. Finally, the cutting edge of the arcuate cutting edge member is ground by a diamond grinder to form a desired cutting edge 20, 21.

(4) Second and Third Screws

Because the second and third screws 15, 16 have the same shape like the second and third inserts 13, 14 in a preferred embodiment of the present invention, explanation will be made only on the second screw 15 as the case may be. This explanation is applicable to the third screw 16.

Figure 18:
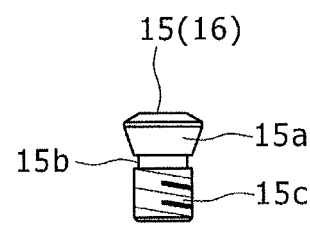
FIG. 18 is a side view showing a second (third) screw for fixing the second (third) insert.
Figure 19:
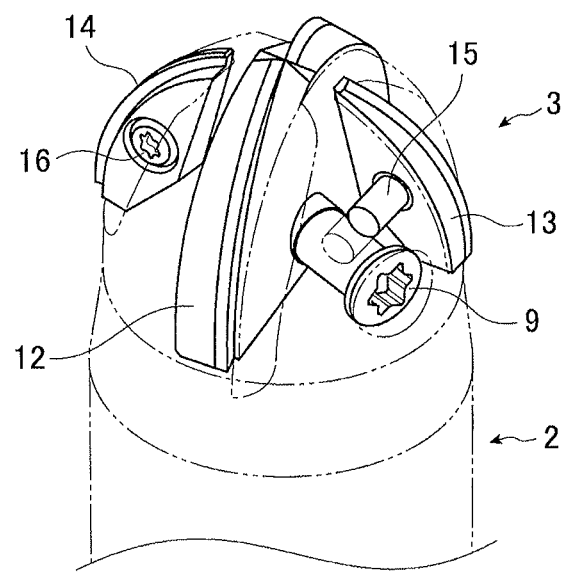
FIG. 19 is a perspective view showing positional relations between first to third inserts attached to the tool body.
Figure 20:
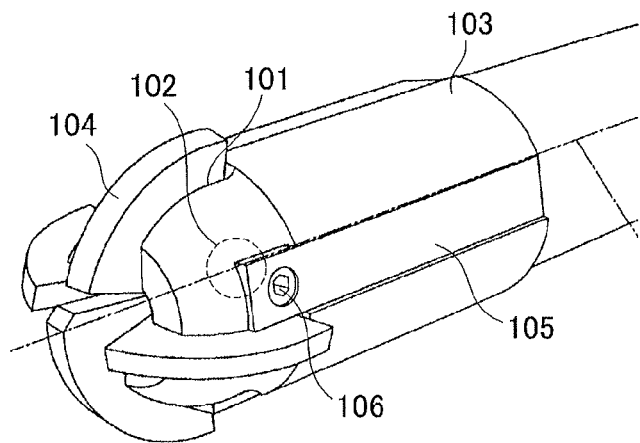
FIG. 20 is a perspective view showing a rotary cutting tool disclosed in JP 60-85815 A.
Figure 21:
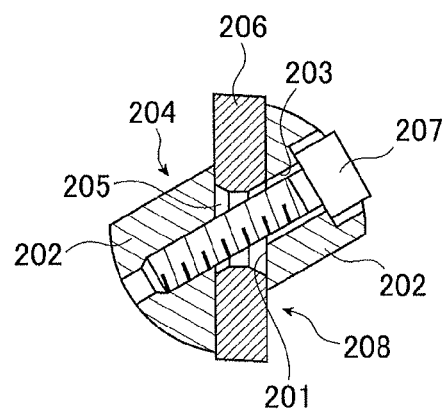
FIG. 21 is a transverse cross-sectional view showing a boring tool disclosed in JU 54-29490 A.
Figure 22:
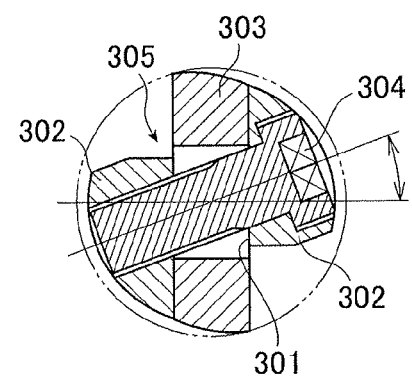
FIG. 22 is a transverse cross-sectional view showing a throwaway end mill disclosed in JP 2001-121339 A.
Figure 23:
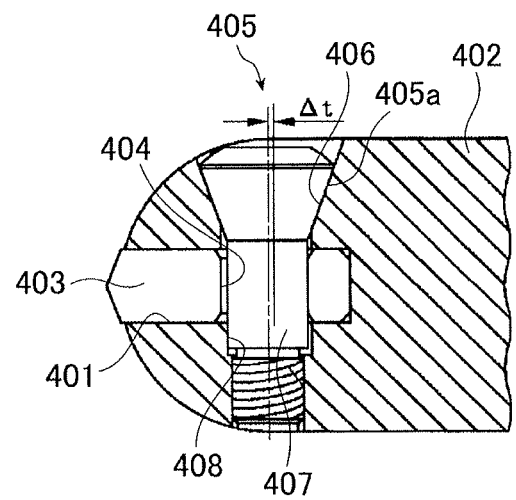
FIG. 23 is a longitudinal cross-sectional view showing a throwaway-type cutting tool disclosed in JP 11-239911 A.
Figure 24:
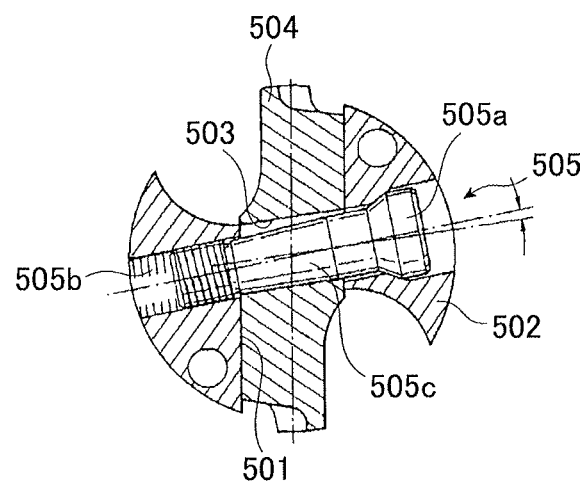
FIG. 24 is a transverse cross-sectional view showing a boring tool disclosed in Japanese Patent 4531981.

The second screw 15 shown in FIG. 18 comprises a head 15a, a cylindrical portion 15b, and a threaded portion 15c. The second screw 15 penetrates the second hole 13f of the second insert 13, with its threaded portion 15c threadably engaging the second threaded hole 5c of the second seat 5. Thus, the second insert 13 is firmly fixed to the second seat 5. Likewise, the third insert 14 is firmly fixed to the third seat 6 with the third screw 16.

The second and third screws 15, 16 can be produced from a rod of tool steel such as SK61, etc. by machining like the first screw 9.

(5) Fixing of Insert to Tool Body

The first to third inserts 12, 13, 14 can be fixed to the tool body 2 by the following steps.

(a) Step 1

The first insert 12 is inserted into the slit-shaped first seat 4, and temporarily fixed with the first screw 9.

(b) Step 2

The second insert 13 is attached to the second seat 5, and temporarily fixed with the second screw 15.

(c) Step 3

The third insert 14 is attached to the third seat 6, and temporarily fixed with the third screw 16.

(d) Step 4

After the positions and angles of the first to third inserts 12, 13, 14 are adjusted, the first to third screws 9, 15, 16 are fastened with a predetermined torque to precisely fix the first to third inserts 12, 13, 14 to the first to third seats 4, 5, 6.

The present invention will be explained in further detail by Examples below, without intention of restricting the present invention thereto.

Example 1

Positioning Precision in Fixing First Insert

The cutting edges of inserts are worn as the cutting time passes, resulting in decreased cutting precision. Accordingly, the inserts are exchanged to new ones when reaching a predetermined cutting time. If there were error in positioning the cutting edges of new inserts, cutting precision would decrease. Particularly in the finishing cutting of a die cavity, etc., the positioning precision of cutting edges should be extremely high. Thus, positioning precision was measured when the first insert 12 was repeatedly fixed to the first seat 4.

Four types of first inserts 12 each comprising a finished, small-diameter, cylindrical center hole portion 22a having an inner diameter $D_1$ in a range from 5 mm+5 μm to 5 mm+15 μm and a thickness of 5 mm, and three types of first screws 9 each comprising a finished, large-diameter, solid cylinder portion 9c having an outer diameter $d_1$ in a range from 5 mm-5 μm to 5 mm+2 μm were prepared. The surface roughness Rza of each finished, small-diameter, cylindrical center hole portion 22a and the surface roughness Rzb of each large-diameter, solid cylinder portion 9c were measured. Each of 12 combinations of these first inserts 12 and these first screws 9 was fixed to a 4-flute tool body 2 having an outer diameter of 30 mm as shown in FIGS. 1-4. With respect to a combination of the same first insert 12 and the same first screw 9, attachment and detachment were repeated 5 times. With the position of cutting edges (the position of a point P shown in FIG. 6, at which the arcuate cutting edges 17a, 17b had the maximum diameter) at the first attachment as a reference (0), the difference between the above reference and the position of cutting edges at the second attachment and subsequent was regarded as the fixing position precision S of the first insert 12.

The inner diameter $D_1$ and surface roughness Rza of the finished, small-diameter, cylindrical center hole portion 22a of the first insert 12, the outer diameter $d_1$ and surface roughness Rzb of the finished, large-diameter, solid cylinder portion 9c of the first screw 9, and the fixing position precision S of the cutting edges and its evaluation are shown in Table 1. The fixing position precision S was evaluated by the following standard.

Excellent: The fixing position precision S was less than ±1.5 μm 4 times.
Good: The fixing position precision S was ±1.5 μm≤S<±4.0 μm at least once.
Fair: The fixing position precision S was more than ±4.0 μm at least once.

TABLE 1

| Test No. | Small-Diameter, Cylindrical Center Hole Portion (μm) | | Large-Diameter Solid Cylinder Portion (μm) | | Clear-ance (μm) | Fixing Position Precision | |
|---|---|---|---|---|---|---|---|
| | $D_1^{(1)}$ | Rza$^{(2)}$ | $d_1^{(3)}$ | Rzb$^{(4)}$ | | Precision S (μm) | Evaluation |
| 1 | +5 | 0.4 | +2 | 1.5 | 1.5 | <±1.0 | Excellent |
| 2 | +5 | 0.4 | 0 | 3.2 | 2.5 | <±1.5 | Excellent |
| 3 | +5 | 0.4 | −5 | 6.3 | 5.0 | <±4.0 | Good |
| 4 | +7 | 0.8 | +2 | 1.5 | 2.5 | <±1.0 | Excellent |
| 5 | +7 | 0.8 | 0 | 3.2 | 3.5 | <±1.5 | Excellent |
| 6 | +7 | 0.8 | −5 | 6.3 | 6.0 | <±4.0 | Good |
| 7 | +11 | 1.6 | +2 | 1.5 | 4.5 | <±4.0 | Good |
| 8 | +11 | 1.6 | 0 | 3.2 | 5.5 | <±4.0 | Good |
| 9 | +11 | 1.6 | −5 | 6.3 | 8.0 | <±6.0 | Fair |
| 10 | +15 | 3.2 | +2 | 1.5 | 6.5 | <±6.0 | Fair |
| 11 | +15 | 3.2 | 0 | 3.2 | 7.5 | <±8.0 | Fair |
| 12 | +15 | 3.2 | −5 | 6.3 | 10.0 | <±9.0 | Fair |

Note:
[1] The inner diameter expressed by difference from 5 mm.
[2] The surface roughness Rza of the finished, small-diameter, cylindrical center hole portion 22a.
[3] The outer diameter expressed by difference from 5 mm.
[4] The surface roughness Rzb of the finished, large-diameter, solid cylinder portion 9c.

As is clear from Table 1, in combinations (Test Nos. 1, 2, 4, 5) of the first inserts 12 each comprising a small-diameter, cylindrical center hole portion 22a having surface roughness Rza of 0.8 μm or less, and the first screws 9 each comprising a large-diameter, solid cylinder portion 9c having surface roughness Rzb of 3.2 μm or less, the fixing position precisions S of the first inserts 12 were as extremely high as less than ±1.5 μm. On the other hand, in combinations in which the fixing position precisions S exceeded ±4.0 μm, a long period of time was needed to finely adjust the fixing position of the first insert 12.

The above results reveal that when the first insert 12 comprising a small-diameter, cylindrical center hole portion 22a having surface roughness Rza of 0.8 μm or less and the first screw 9 comprising a large-diameter, solid cylinder portion 9c having surface roughness Rzb of 3.2 μm or less are combined, the first insert 12 can be fixed to the slit-shaped first seat 4 of the semispherical tip end portion 3 with high precision.

Example 2

Cutting Test 1

Four types of ball end mills B1-B4 having the specifications shown in Table 2 were prepared. The ball end mills B1 and B2 are the four-flute indexable ball end mills of the present invention comprising first to third inserts of WC-based cemented carbide, the ball end mill B3 is a conventional 2-flute indexable ball end mill comprising only a first insert of WC-based cemented carbide, and the ball end mill B4 is a conventional ball end mill comprising four cutting edge chips of WC-based cemented carbide brazed to a tool body. Any WC-based cemented carbide comprised WC having an average particle size of 0.6 μm, with 8.0% by mass of Co.

As shown in Table 2, in the indexable ball end mills B1 and B2 of the present invention, both of the inclination angle θ of the first threaded hole 8 in the semispherical tip end portion 3, and the inclination angle δ of the small-diameter, cylindrical center hole portion 22a of the first insert 12 were 25°, the inner diameter $D_1$ of the small-diameter, cylindrical center hole portion 22a was 5.007 mm, and the outer diameter $d_1$ of the large-diameter, solid cylinder portion 9c of the first screw 9 was 4.997 mm.

Because the conventional indexable ball end mill B3 had two cutting edges, both of the angle θ and the angle δ were 0°. Because the conventional ball end mill B4 comprised four cutting edge chips brazed, there were no angle θ and angle δ.

TABLE 2

| | Tool Body | | | |
|---|---|---|---|---|
| Ball End Mill | B1 | B2 | B3 | B4 |
| Number of cutting edges | 4 | 4 | 2 | 4[1] |
| Tool diameter (mm) | 30 | 30 | 30 | 30 |
| Projection length (mm) | 110 | 110 | 110 | 110 |
| θ (°) | 25 | 25 | 0 | — |
| | First Insert | | | |
| Material | Cemented Carbide | Cemented Carbide | Cemented Carbide | Cemented Carbide |
| Cutting edge radius (mm) | 15 | 15 | 15 | 15 |
| Thickness (mm) | 5 | 5 | 7 | 5 |
| β (°) | 180 | 180 | 180 | 180 |
| δ (°) | 25 | 25 | 0 | — |

TABLE 2-continued

| | Second and Third Inserts | | | |
|---|---|---|---|---|
| Material | Cemented Carbide | Cemented Carbide | — | Cemented Carbide |
| Cutting edge radius (mm) | 15 | 15 | — | 15 |
| Thickness (mm) | 3.6 | 3.6 | — | 5 |
| α (°) | 20 | 20 | — | 20 |
| γ (°) | 90 | 90 | — | 90 |
| TiSiN coating on first to third inserts | Yes | Yes/No[(2)] | Yes | No |
| Hard sintered cutting edge chip | No | Yes | No | No |

Note:
[(1)]Brazed.
[(2)]The first insert was coated with TiSiN, and the second and third inserts were not coated with TiSiN.

Using each ball end mill B1-B4, a cutting test was conducted on the vertical and horizontal walls of a work made of FCD550 (HB: 220), to evaluate machining efficiency. The cutting conditions were as follows:
Machining method: Dry finish-cutting,
Cutting speed: 1130 m/min,
Rotation speed: 12000 rpm,
Feed speed: 10800 mm/min,
Feed per one cutting edge: 0.22-0.45 mm/edge,
Longitudinal cutting depth: 0.15 mm,
Radial cutting depth: 0.5 mm, and
Tool projection length: 110 mm.

A time period until the dimensional change of the cutting edges of the first to third inserts 12, 13, 14 reached 0.01 mm, or until the depth of wear in the flank reached 0.05 mm, was defined as an insert life. The results are shown in Table 3.

TABLE 3

| | Insert Life (minute) | |
|---|---|---|
| Ball End Mill | Cutting of Vertical Wall | Cutting of Horizontal Wall |
| B1[(1)] | 240 | 600 |
| B2[(1)] | 800 | 650 |
| B3[(2)] | 120 | 550 |
| B4[(2)] | 20 | 100 |

Note:
[(1)]The indexable ball end mill of the present invention.
[(2)]Conventional ball end mill.

In the vertical wall-cutting test evaluating the wear resistance of the insert among the cutting test 1, the conventional 2-flute indexable ball end mill B3 had an insert life of 120 minutes, and the brazed conventional four-flute ball end mill B4 without surface treatment for heat resistance had as short an insert life as 20 minutes. On the other hand, the indexable ball end mills B1 and B2 of the present invention had insert lives of 240 minutes and 800 minutes, respectively. Thus, the indexable ball end mills B1 and B2 of the present invention exhibited excellent wear resistance in high-speed cutting of the vertical wall, achieving a long life. The reason why the indexable ball end mill of the present invention has a long insert life even in high-speed cutting appears to be that it has four cutting edges due to the above first and second features.

Apart from the above test, a vertical wall was cut at a speed of 500 m/min with the indexable ball end mills B1, B2 of the present invention. As a result, the insert life increased to 1200 minutes in B1, and to 2500 minutes in B2. This indicates that the indexable ball end mill of the present invention exhibits not only high efficiency and a long life in high-speed cutting of 1000 m/min, but also high wear resistance and a long life in a conventionally used cutting speed of 500 m/min.

In the horizontal wall-cutting test, the conventional 2-flute indexable ball end mill B3 had an insert life of 550 minutes, and the brazed conventional four-flute ball end mill had an insert life of 100 minutes. On the other hand, the indexable ball end mills B1 and B2 of the present invention had as long insert lives as 600 minutes and 650 minutes, respectively. This indicates that even in the low-speed cutting of a horizontal wall with cutting edges near a tip end of a ball end mill, the indexable ball end mill of the present invention exhibits a good insert life.

Example 3

Cutting Test 2

Four types of ball end mills B5-B8 having the specifications shown in Table 4 below were prepared as in Example 2. The inclined hole 22 of the first insert 12 attached to the indexable ball end mills B5, B6 of the present invention had an inclination angle δ of 25°, the small-diameter, cylindrical center hole portion 22a had an inner diameter $D_1$ of 5.007 mm, and the large-diameter, solid cylinder portion 9c of the first screw 9 had an outer diameter $d_1$ of 4.997 mm.

TABLE 4

| | Tool Body | | | |
|---|---|---|---|---|
| Ball End Mill | B5 | B6 | B7 | B8 |
| Number of cutting edges | 4 | 4 | 2 | 4[(1)] |
| Tool diameter (mm) | 30 | 30 | 30 | 30 |
| Projection length (mm) | 110 | 110 | 110 | 110 |
| θ (°) | 25 | 25 | 0 | — |

| | First Insert | | | |
|---|---|---|---|---|
| Material | Cemented Carbide | Cemented Carbide | Cemented Carbide | Cemented Carbide |
| Cutting edge radius (mm) | 15 | 15 | 15 | 15 |
| Thickness (mm) | 5 | 5 | 7 | 5 |
| β (°) | 180 | 180 | 180 | 180 |
| δ (°) | 25 | 25 | 0 | — |

| | Second and Third Inserts | | | |
|---|---|---|---|---|
| Material | Cemented Carbide | Cemented Carbide | — | Cemented Carbide |
| Cutting edge radius (mm) | 15 | 15 | — | 15 |
| Thickness (mm) | 3.6 | 3.6 | — | 5 |
| α (°) | 20 | 20 | — | 20 |
| γ (°) | 90 | 90 | — | 90 |
| TiSiN coating on first to third inserts | Yes | Yes/No[(2)] | Yes | No |
| Hard sintered cutting edge chip | No | Yes | No | No |

Note:
[(1)]Brazed.
[(2)]The first insert was coated with TiSiN, and the second and third inserts were not coated with TiSiN.

Using each ball end mill B5-B8, the vertical and horizontal walls of a work of SK11 (HRC: 60) were cut under the following conditions:
Machining method: Dry finish-cutting,
Cutting speed: 300 m/min,
Rotation speed: 3200 rpm,
Feed speed: 1920 mm/min,
Feed per one cutting edge: 0.15-0.3 mm/edge,
Longitudinal cutting depth: 0.15 mm,
Radial cutting depth: 0.5 mm, and
Tool projection length: 110 m.

A time period until the dimensional change of the cutting edges of the first to third inserts 12, 13, 14 reached 0.03 mm, or until the depth of wear in the flank reached 0.15 mm, was defined as an insert life. The results are shown in Table 5.

TABLE 5

| Ball End Mill | Insert Life (minute) | |
|---|---|---|
| | Cutting of Vertical Wall | Cutting of Horizontal Wall |
| B5 | 65 | 220 |
| B6 | 230 | 240 |
| B7 | 33 | 200 |
| B8 | 3 | 20 |

In the vertical wall-cutting test evaluating the wear resistance of the insert, the conventional 2-flute indexable ball end mill B7 had an insert life of 33 minutes, and the brazed conventional four-flute ball end mill B8 comprising inserts without surface treatment for heat resistance had as short an insert life as 3 minutes. On the other hand, the indexable ball end mills B5 and B6 of the present invention had insert lives of 65 minutes and 230 minutes, respectively. This indicates that the indexable ball end mills B5, B6 of the present invention exhibited excellent wear resistance in the high-speed cutting of a vertical wall of a die, etc., resulting in a long life.

In the horizontal wall-cutting test evaluating the wear resistance of the insert, the conventional 2-flute indexable ball end mill B7 had an insert life of 200 minutes, and the brazed conventional four-flute ball end mill B8 had an insert life of 20 minutes. On the other hand, the indexable ball end mills B5 and B6 of the present invention had insert lives of 220 minutes and 240 minutes, respectively. This indicates that with the above first and second features, the indexable ball end mill of the present invention exhibits a good insert life even in a horizontal wall-cutting test needing wear resistance.

The above results of the fixing position precision test of the first insert and the cutting tests 1 and 2 reveal that the indexable ball end mill of the present invention has higher wear resistance than those of conventional ball end mills in the high-speed cutting of vertical and horizontal walls of works of FCD550 castings and dies of high-hardness cold-work die steel SKD11 (HRC: 62), thereby exhibiting a longer insert life.

EFFECT OF THE INVENTION

Because the indexable ball end mill of the present invention has a structure in which the first insert is fixed to the semispherical tip end portion with a slantingly penetrating first screw, it has sufficient space for the second and third screws for fixing the second and third inserts even with the first screw. Such a structure provides the indexable ball end mill of the present invention with four cutting edges, enabling the high-speed, high-precision cutting of vertical walls of die cavities, etc., with a remarkably longer insert life than those of 2-flute ball end mills.

In addition, because the hole of the first insert and the first screw have finished surfaces, the finished surface of the hole of the first insert tightly engages the finished surface of the first screw when the first screw penetrates the first insert attached to the first seat, resulting in the precise positioning of the first insert. Thus, the precise positioning of exchanged inserts can be conducted easily.

What is claimed is:

1. A four-flute indexable ball end mill comprising first to third inserts having arcuate cutting edges detachably attached with first to third screws to first to third seats in a semispherical tip end portion of a tool body,
    said first seat being constituted by a slit extending in a diametrical direction with a rotation center axis of said semispherical tip end portion as a center, a chip pocket being located in front of said slit in a rotation direction, and said slit dividing said semispherical tip end portion to two half bodies;
    each of said second and third seats being a notch formed in each half body, each notch comprising a seating surface provided in a front surface of each half body in a rotation direction, and a chip pocket located in front of said seating surface in a rotation direction;
    a first threaded hole for said first screw slantingly penetrating said slit from one half body to the other half body in said semispherical tip end portion, said first threaded hole being inclined to a straight line perpendicular to the centerline of said first seat in a direction opposite to the rotation direction of said tool body, and second and third threaded holes for said second and third screws being open on the seating surfaces of said second and third seats, thereby avoiding interference between said first screw and said second and third screws;
    said first insert having an inclined hole which is aligned with said first threaded hole when said first insert is attached to said first seat; and
    at least part of the hole of said first insert having a finished surface, said first screw having a finished surface at least partially between its head and its threaded portion, and the finished surface of the hole of said first insert tightly engaging the finished surface of said first screw when said first screw penetrates said first insert attached to said first seat, thereby precisely positioning said first insert.

2. The four-flute indexable ball end mill according to claim 1, wherein said first threaded hole is located on the rear side of said second and third threaded holes in the tool body.

3. The four-flute indexable ball end mill according to claim 1, wherein a straight line connecting a pair of cutting edges of said first insert is perpendicular to a straight line connecting the cutting edges of said second and third inserts.

4. The four-flute indexable ball end mill according to claim 1, wherein the arcuate cutting edges of said first insert attached to said first seat pass substantially an apex of said semispherical tip end portion, and wherein an angle $\alpha$ between a top end of the arcuate cutting edge of each of said second and third inserts attached to said second and third seats and a rotation center axis of said tool body is 15-30°.

5. The four-flute indexable ball end mill according to claim 1, wherein the arcuate cutting edges of said first insert have a center angle $\beta$ of 180° or more, and wherein the arcuate cutting edges of said second and third inserts have a center angle $\gamma$ of 90° or less.

6. The four-flute indexable ball end mill according to claim 1, wherein said first insert is made of cemented carbide.

7. The four-flute indexable ball end mill according to claim 1, wherein each of said second and third inserts has a structure in which an arcuate cutting edge chip of sintered cubic boron nitride is bonded to a cemented carbide substrate.

8. The four-flute indexable ball end mill according to claim 1, wherein the finished surface of the inclined hole of said first insert has smaller surface roughness than that of the finished surface of said first screw.

9. The four-flute indexable ball end mill according to claim 1, wherein the inclination angle $\theta$ of said first threaded hole to a straight line perpendicular to the centerline of said first seat is 20-40° in a direction opposite to the rotation direction of said tool body.

10. The four-flute indexable ball end mill according to claim 1, wherein the hole of said first insert comprises a finished, small-diameter, cylindrical center hole portion, and large-diameter, cylindrical hole portions on both sides of said small-diameter, cylindrical center hole portion, and wherein said first screw comprises a finished, large-diameter, solid cylinder portion between the head and the threaded portion.

11. The four-flute indexable ball end mill according to claim 10, wherein the inner diameter of said small-diameter, cylindrical center hole portion is larger than the outer diameter of said large-diameter, solid cylinder portion by 3-10 µm.

* * * * *